United States Patent Office 3,211,711
Patented Oct. 12, 1965

3,211,711
PROCESS OF POLYMERIZING VINYL ESTERS USING DIALKYL ZINC COMPOUNDS AS CATALYSTS
Tamotsu Eguchi, Kiyoshi Fujii, Junji Ukida, and Masakazu Matsumoto, all of Kurashiki, Japan, assignors to Kurashiki Rayon Co., Ltd., Okayoma Prefecture, Japan, a corporation of Japan
No Drawing. Filed Apr. 20, 1960, Ser. No. 23,364
Claims priority, application Japan, Apr. 23, 1959, 34/12,767, 34/12,768
2 Claims. (Cl. 260—89.1)

This invention relates to the polymerization of vinyl esters and is more particularly concerned with a process for polymerizing lower alkyl vinyl esters to produce polymers therefrom.

It is known that vinyl esters can be polymerized in bulk, in solution, or in emulsified form by means of peroxides, such as benzoyl peroxide, and the like, and by means of azo-compounds, such as alpha-alpha'-azobis-iso-butyronitrile, and the like. Recently, it has been disclosed that compounds of boron and cadmium may be effective as catalysts in the polymerization of vinyl esters and other monomers (Furukawa et al., Industrial Chemistry, vol. 61, pp. 728, 1631, 1958).

It is an object of the present invention to provide an improved process for producing good-quality polymers of vinyl esters.

In accordance with the present invention, vinyl esters are polymerized by means of a catalyst which is an organic compound of aluminum or zinc, these organic compounds being employed in the presence or air, oxygen, or other oxidizers. More particularly, the organic compounds of aluminum or zinc are employed in quantities within predetermined ranges with respect to the vinyl esters monomer being polymerized.

It is a feature of the invention that polymerization in the presence of organic compounds of aluminum or zinc while the monomer is exposed to air or oxygen produces white or colorless polymers having a high degree of polymerization even when polymerization is carried out at room temperature, e.g. 25° C., or below, e.g. down to —30° C. Previous work in this field has led to the belief that organic compounds of aluminum or zinc are not effective catalysts for the polymerization of vinyl esters because it has been believed that when such compounds are present in any substantial quantity the vinyl esters will be decomposed to form aldehydes with essentially no evidence of any polymerization. In addition, the reaction mixture turns brown or yellow-brown.

We have discovered, however, that if the organic compounds or aluminum or zinc are employed as catalysts in the presence of oxygen or air within a predetermined quantity range with respect to the quantity of vinyl ester, the vinyl ester can be smoothly polymerized without discoloration so that a white or colorless polymer can be directly obtained. Thus, in accordance with the invention, the organic compound of aluminum or zinc is employed in the proportion of 0.1 to 1.4 mole-percent, based on a mole of monomer, the range being more particularly 0.2 to 1.4 mole-percent in the case of an organic compound of zinc and 0.1 to 1.2 mole-percent in the case of an organic compound of aluminum. Preferably, the quantity of the organic compound is 0.3 to 0.8 mole-percent, with a range of 0.3 to 0.5 mole-percent being particularly preferred in the case of organic compounds of aluminum and a range of 0.5 to 0.8 mole-percent being particularly preferred in the case of organic compounds of zinc. The minimum quantity of oxygen is 3 atoms of oxygen per atom of aluminum or zinc. The oxygen may be present as pure oxygen, or as air or other gaseous mixture with inert gases. Excess oxygen may be used if desired.

When the quantity of the catalyst is not within the range specified above, both the rate of polymerization and the degree of polymerization of the vinyl ester decrease substantially, and greatly inferior products are produced which tend not to have practical utility. It is our belief that the oxygen present functions as an auxiliary catalyst or promoter. As long as the minimum quantity of oxygen specified above is present, the presence of excess quantities does not adversely affect the rate of polymerization the degree of polymerization, or the other properties of the polymer produced, although such excess generaly serves no useful purpose.

When polymerization of vinyl esters by means of catalysts in accordance with the present invention is compared with polymerization with conventional catalysts, such as peroxides and azo-compounds, the following performance factors are noted. The rate of polymerization with the catalysts of the invention becomes highest with 0.3 to 0.5 mole percent of catalyst based on 1 mole of vinyl ester, in the case of aluminum compounds, and 0.5 to 0.8 mole-percent in the case of zinc compounds. If the quantity of the catalyst is less than the minimum values of these ranges, the rate of polymerization tends to become lower relatively rapidly. Furthermore, if the quantity of catalyst is increased beyond these ranges, the rate of polymerization also decreases. The degree of polymerization of the polymer obtained likewise tends to be lower when catalyst quantities outside these ranges are used. However, the quantity of catalyst which will give the maximum degree of polymerization in the polymer obtained will lie at the lower end, or even below, the range of the quantity of catalyst which will give the maximum rate of polymerization. Thus, in the case of the organic compounds of zinc, the maximum degree of polymerization is obtained when 0.3 to 0.4 mole-percent of the organic compound is used. While various temperatures of polymerization may be employed, including room temperature, we have found that the rate of polymerization becomes highest in the case of organic aluminum catalysts at temperatures of 0° C. to —10° C. Moreover, the degree of polymerization of the polymer produced with such catalysts also becomes highest at these temperatures. Furthermore, a minimum quantity of organic aluminum catalyst will give the maximum rate of polymerization and the maximum degree of polymerization at temperatures of 0° C. to —10° C. By using a solvent or diluent and by varying the quantity of solvent or diluent in which polymerization is carried out, a polymer having any desired degree of polymerization can easily be obtained, as known in the art.

Organic compounds of aluminum suitable for use as catalysts in accordance with the present invention include trialkyl-aluminum compounds, e.g. those with alkyl groups each containing up to 8 carbon atoms, such as trimethylaluminum, triethyl-aluminum, tripropyl-aluminum, tri-isobutyl-aluminum, trioctyl-aluminum, and the like, as well as other organic compounds of aluminum such as di-alkyl aluminum compounds, e.g. diethyl aluminum chloride, diisobutyl aluminum hydride, and the like. Suitable organic zinc compounds include the dialkyl compounds, e.g., di-lower alkyl compounds of zinc, such as dimethyl-zinc, diethyl zinc, dibutyl-zinc, and the like. It will be understood that the compounds may contain different alkyl radicals in the molecule.

Typical monomers with which the above-mentioned catalysts are most satisfactorily used are lower-alkyl vinyl esters, such as vinyl formate, vinyl acetate, and the like.

Polymerization in accordance with this invention can be effected not only in bulk but it can also be effectively carried out when the monomer is admixed with an inert organic diluent or solvent which is liquid at polymerization temperatures and which is free from active hydrogen atoms. Examples of suitable solvents or diluents include aliphatic and cycloaliphatic hydrocarbons, such as petroleum ether, hexane, heptane, and cyclohexane, and the like, halogenated hydrocarbons, such as ethylene chloride and methyl chloride, and ethers such as ethyl ether, dioxane, tetrahydrofuran, and the like. Generally, it is preferred to use aliphatic hydrocarbons when polymerization in a solvent is carried out. However, in the case of organic zinc compounds, it has been found that the use of a solvent or diluent tends to lower the degree of polymerization substantially. It is preferred, therefore, to employ bulk polymerization when organic zinc compounds are used as catalysts.

The nature and features of the invention will be further apparent from the following specific examples of practical application. However, it will be understood that these examples are not to be construed as limiting the scope of the present invention in any manner. In the examples, all parts are by weight unless otherwise indicated.

*Example 1*

A series of tests was carried out in each of which a predetermined quantity of vinyl acetate, e.g. 10 parts by weight, was introduced into a glass test-tube and the tube was then swept with nitrogen. Various quantities of triethyl-aluminum were then added to the several test tubes and in some of the test-tubes part of the nitrogen was replaced by a quantity of air such that the volume of air was approximately one-half the volume of vinyl acetate present. The tubes being closed, polymerization was conducted at 0° C. for a period of 24 hours. The following results were observed: In those tests which were carried out in an atmosphere consisting only of nitrogen, the rate of polymerization was measured as 1% to 3.5%, and the degree of polymerization was found to be 500 to 10,000, the quantity of catalyst being within the range of 0.1 and 1.5 mole-percent (calculated on the basis of 1 mole of vinyl acetate). On the other hand, in those tests in which the quantities of the catalyst were 0.25 mole-percent and 0.49 mole-percent in the presence of air, polymerization rates of 19.7% and 97.3%, respectively, were obtained, and even the polyvinyl alcohols prepared by conventional saponification of the polymers produced had degrees of polymerization of 6,810 and 5,460, respectively. When the quantity of catalyst was 9.8 mole-percent, the rate of polymerization was 0%.

*Example 2*

Another series of tests was made in each of which a predetermined quantity of vinyl acetate, such as used in Example 1, was introduced into a glass test-tube and the tube was swept with nitrogen. Various quantities of triethyl-aluminum were then added to the contents of the several tubes, and air was introduced to replace some of the nitrogen in amounts such that the volume of air inside the tubes was about one-half the volume of vinyl acetate. The tubes being closed, polymerization was carried out at −30° C. for a period of 24 hours. The following results were obtained: When the quantity of catalyst was 0.098 mole-percent, based on 1 mole of vinyl acetate, the rate of polymerization was 0%. When the quantity of catalyst was 0.294 mole-percent, the rate of polymerization was 91.2% and the degree of polymerization of the polyvinyl acetate produced was 14,760. The degree of polymerization of the polyvinyl alcohol produced from this polyvinyl acetate by conventional saponification was 5,720. When the quantity of catalyst was 14.7 mole-percent, the rate of polymerization was 0%.

*Example 3*

A predetermined quantity of vinyl acetate, as used in Examples 1 and 2, was mixed with various proportions of n-hexane in test-tubes. Each tube was then supplied with triethyl-aluminum in the concentration of 53 milli-moles per liter. The tubes were then swept with nitrogen and air was introduced in a volume approximately equal to one-half the volume of the solution in the tube. The tubes being closed as in the previous examples, polymerization was effected at 0° C. for a period of 24 hours. The following results were observed: When the quantities of n-hexane (expressed as volume percent of the entire solution) were 10%, 20%, 40% and 60%, the rates of polymerization were 60.0%, 51.1%, 29.4% and 12.5%, respectively, and the degrees of polymerization were 7,510, 3,780, 2,370 and 1,840, respectively.

*Example 4*

A further series of tests was made in each of which a predetermined quantity of vinyl acetate was charged to a glass test-tube, and the tube was swept with nitrogen. Various quantities of diethyl-zinc were then added to the several tubes and air was introduced to provide a volume corresponding to one-half that of the vinyl acetate. The tubes being sealed, polymerization was carried out at 20° C. for 24 hours. The following results were obtained: When 0.234, 0.390, 0.585 and 1.640 mole-percents of diethyl-zinc in proportion to vinyl acetate were used, the rates of polymerization were found to be 1.6%, 21.8% 32.7% and 6.2%, respectively, and the degree of polymerization of the polyvinyl acetate produced was found to be 2,200, 4,970, 2,120 and 36, respectively.

It will be understood that, unless otherwise indicated, conventional polymerization techniques used in the polymerization process of the present invention and that conventional polymerization equipment suited to the conditions of polymerization is employed. The polyvinyl esters produced by the process of this invention are particularly suitable for conversion to polyvinyl alcohol by any of the known saponification procedures, which polyvinyl alcohol may be used to form fibers or filaments, also by conventional methods. In connection with conventional techniques and methods, reference is suitably made to Cline et al. U.S. Patent 2,610,360.

The conditions and relative relationships set forth above are those preferred in carrying out the process of the invention but it will be understood that other conditions and relationships may be used within the scope of the invention.

It will thus be understood that various changes and modifications may be made without departing from the scope of the invention as defined in the appended claims and it is intended, therefore, that all matter contained in the foregoing description shall be interpreted as illustrative only and not as limitative of the invention.

We claim:

1. A process of producing homopolymers of vinyl acetate which comprises polymerizing said vinyl acetate in the presence of a catalyst consisting essentially of a dialkyl zinc compound wherein the alkyl radical contains from 1 to 8 carbon atoms, said compound being present in the range of 0.1 to 1.4 mole percent of vinyl acetate, said polymerization being carried out in an atmosphere containing oxygen in an amount of at least three atoms per atom of metal in said catalyst.

2. A process according to claim 1 wherein the polymerization temperature is from −30° to 25° C.

References Cited by the Examiner

UNITED STATES PATENTS

| | | | |
|---|---|---|---|
| 2,827,447 | 3/58 | Nowlin | 260—94.9 |
| 3,117,112 | 1/64 | Mirable et al. | 260—89.1 |

FOREIGN PATENTS 819,291   9/59   Great Britain.

JOSEPH L. SCHOFER, *Primary Examiner.*

PHILIP E. MANGAN, HAROLD N. BURNSTEIN, JOSEPH R. LIBERMAN, WILLIAM H. SHORT, *Examiners.*